(12) United States Patent
Constantin et al.

(10) Patent No.: US 11,226,232 B2
(45) Date of Patent: Jan. 18, 2022

(54) MULTICHROMATIC CALIBRATION METHOD AND DEVICE

(71) Applicant: ECOLE POLYTECHNIQUE FEDERALE DE LAUSANNE (EPFL), Lausanne (CH)

(72) Inventors: Dragos Constantin, Lausanne (CH); Simon De Visscher, Donneloye (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 16/651,060

(22) PCT Filed: Sep. 26, 2018

(86) PCT No.: PCT/IB2018/057452
§ 371 (c)(1),
(2) Date: Mar. 26, 2020

(87) PCT Pub. No.: WO2019/064195
PCT Pub. Date: Apr. 4, 2019

(65) Prior Publication Data
US 2020/0264046 A1    Aug. 20, 2020

(30) Foreign Application Priority Data
Sep. 26, 2017    (WO) .................. PCT/IB2017/055852

(51) Int. Cl.
*G01J 3/10*    (2006.01)
*G01J 3/02*    (2006.01)
(Continued)

(52) U.S. Cl.
CPC ............... *G01J 3/10* (2013.01); *G01J 3/0208* (2013.01); *G01J 3/0297* (2013.01); *G01J 3/18* (2013.01);
(Continued)

(58) Field of Classification Search
CPC .......... G01J 3/10; G01J 3/0208; G01J 3/0297; G01J 3/2823; G01J 3/2803; G01J 3/0254; G01J 2003/1247; G01J 2003/2826
See application file for complete search history.

(56) References Cited

U.S. PATENT DOCUMENTS

| 3,971,065 A | 7/1976 | Bayer |
| 5,192,981 A | 3/1993 | Slutter et al. |
| (Continued) | | |

FOREIGN PATENT DOCUMENTS

| EP | 3 054 273 | 8/2016 |
| WO | 2013/064510 A1 | 5/2013 |

OTHER PUBLICATIONS

W Brown et al "NIST facility for Spectral Irradiance and Radiance Responsivity Calibrations with Uniform Sources" 2000 Metrologia 37 579 (Year: 2000).*

(Continued)

*Primary Examiner* — Maurice C Smith
(74) *Attorney, Agent, or Firm* — Nixon & Vanderhye P.C.

(57) ABSTRACT

A Multichromatic Calibration (MC) method of at least a spectral sensor which is one of a list comprising at least a spectrometer, a multispectral sensor, a hyperspectral sensor, a spectral camera, a color camera. The method comprises a. generating a plurality of different multichromatic spectra, wherein i. a spectrum from the plurality of different multichromatic spectra contains light intensity measurable by the at least one spectral sensor and by a reference spectral device, and ii. a spectrum from the plurality of different multichromatic spectra contains light centered around at least two different wavelengths and is configured to be integrated during an exposure time of a single measurement from any of the at least one spectral sensor or the reference spectral device; b. measuring each multichromatic spectrum of the plurality of different multichromatic spectra with the (Continued)

reference spectral device and the at least one spectral sensor; and from all data of the measured multichromatic spectra, compute a transfer function which relates a response of the at least one spectral sensor to a corresponding response of the reference spectral device, without measuring the spectral response of the at least one spectral sensor.

13 Claims, 11 Drawing Sheets

(51) Int. Cl.
*G01J 3/18* (2006.01)
*G01J 3/26* (2006.01)
*G01J 3/28* (2006.01)
*G01J 3/51* (2006.01)
*G01J 3/12* (2006.01)

(52) U.S. Cl.
CPC ............... *G01J 3/26* (2013.01); *G01J 3/2803* (2013.01); *G01J 3/2823* (2013.01); *G01J 3/51* (2013.01); *G01J 2003/1247* (2013.01); *G01J 2003/2826* (2013.01)

(56) References Cited

U.S. PATENT DOCUMENTS

| | | | |
|---|---|---|---|
| 6,618,079 B1 * | 9/2003 | Higuchi | H04N 9/646 348/223.1 |
| 6,657,758 B1 | 12/2003 | Garner | |
| 7,259,784 B2 * | 8/2007 | Cutler | G06T 5/008 348/223.1 |
| 10,580,341 B2 * | 3/2020 | Jia | G01J 1/4204 |
| 2003/0011767 A1 | 1/2003 | Imura et al. | |
| 2009/0051910 A1 | 2/2009 | Imura | |
| 2011/0084717 A1 | 4/2011 | Fong et al. | |
| 2013/0003064 A1 | 1/2013 | Allen et al. | |
| 2014/0111807 A1 | 4/2014 | Yin et al. | |

OTHER PUBLICATIONS

Joseph P. Rice, et al., "DMD diffraction measurements to support design of projectors for test and evaluation of multispectral and hyperspectral imaging sensors", Spie Defense and Security Symposium, Mar. 16-20, 2008, vol. 7210, Feb. 9, 2009, 10 pages.
International Search Report for PCT/IB2018/057452 dated Feb. 15, 2019, 4 pages.
Written Opinion of the ISA for PCT/IB2018/057452 dated Feb. 15, 2019, 9 pages.
Fastie, William G., "A Small Plane Grating Monochromator," Journal of the Optical Society of America, vol. 42, No. 9, Sep. 1952, pp. 641-647.
Saari, Heikki, et al., "Compact Infrared Hyperspectral Imagers Based on Piezo-Actuated Fabry-Perot Interferometers," VTT Microelectronic Systems, 2 pages.
Taguchi, Hiroshi, et al., "Technology of color filter materials for image sensor," FUJIFILM Electronic Materials Co., Ltd. (FFEM), 4 pages.
Woodward, John T., et al., "Hyperspectral Imager Characterization and Calibration," IGARSS 2009, pp II-77- II-80, XP31631395A.
Yokogawa, Sozo, et al., "Plasmonic Color Filters for CMOS Image Sensor Applications," NANO Letters, vol. 12, No. 8, 2012, pp. 4349-4354.
CMV2000 Datasheet v3.2, CMOSIS Image Sensors, 2.2 Megapixel machine vision CMOS image sensor, 2012, 62 pages.
International Search Report dated Jun. 12, 2018, issued in International Application No. PCT/IB2017/055852, 5 pages.
Written Opinion of the International Searching Authority dated Jun. 12, 2018, issued in International Application No. PCT/IB2017/055852, 6 pages.

* cited by examiner

MULTICHROMATIC CALIBRATION METHOD AND DEVICE

This application is the U.S. national phase of International Application No. PCT/IB2018/057452 filed Sep. 26, 2018 which designated the U.S. and claims priority to PCT/IB2017/055852 filed Sep. 26, 2017, the entire contents of each of which are hereby incorporated by reference.

TECHNICAL FIELD OF INVENTION

The invention relates to the field of radiometry and spectral sensing device calibration. More specifically, the invention relates to a method and an apparatus intended to calibrate at least one spectral sensing device through the generation of a large number of various spectra and the use of a reference spectral device.

BACKGROUND OF INVENTION

The spectroscopic analysis of light has proven its uses in a vast number of applications where chemical composition of objects needs to be determined remotely [10]. The application range of spectroscopic measurements has been greatly extended by the advent of fast and high-resolution silicon sensors, as well as the possibility of factoring micrometer-scaled filters on single silicon pixel (snapshot spectral sensors). Radiometric calibration of such spectral cameras is an element of first importance for their optimal use, mainly due to the performance variability in sensor production, and the dependency of their spectral characteristics on the optical systems used. Such calibration of spectral sensors is classically done with monochromators, which emit a thin spectrum around a central wavelength of light. Calibration is achieved by controlling this central wavelength and sequentially scanning the spectral sensitivity range of the spectral sensor thus obtaining the camera spectral sensitivity curve. Such approach works well with small, sensitive sensors, however the low light output makes a monochromator impractical for use with a complete camera system, where the lens, aperture and filters further reduce the light reaching the large sensor. Spanning the entire spectral range of the sensor with long enough exposure times can therefore take overwhelmingly long time and can generate significant image noise in the process. The low light output is an issue inherent to the use of diffractive systems associated with an entrance slit. Apart for large installations, simultaneous calibration of more than one hyperspectral camera is not realistic.

One of the most important distinguishing factors between spectral sensors used for quantified remote-sensing measurements, and sensors used for photography lies in the correlation of the spectral sensitivity between the sensor bands. A spectral sensor is used to sample the spectrum in a non-correlated way, such that an accurate reconstruction of the imaged object's spectrum is possible. On the other hand, devices such as color sensors used in photography, are only required to simulate adaptive human vision and are not fit to produce absolute spectral measurements. In order for a spectral sensor to produce an accurate measurement, its bands need to ideally sample different parts of the spectrum with no correlation. We present below a list of spectral sensors and cameras, together with a summary of their spectral characteristics.

Spectrometers and pushbroom hyperspectral cameras are devices that employ diffraction gratings and imaging sensors to generate a large amount of narrow spectral bands. The spectral bandwidth can vary between 0.5 and 2 nm and the spectral sensitivity curve is usually Gaussian and centered around each band's wavelength. These devices produce some of the highest quality spectral measurements of all existing spectral sensors.

Multi-sensor, single band hyperspectral cameras, often deployed on satellites and in industrial factories, use passband filters in front of multiple imaging sensors and fuse images together to create a single spectral image. A similar output can be achieved with multiple filters rotated in front of a single sensor. The spectral bandwidth for such devices varies between 2 and 150 nm and their sensitivity is well limited to their target central wavelength. Slight correlations between spectral bands can exist, but are generally negligible.

Spectral snapshot cameras are a recent development in spectral sensor technology. These cameras employ a spectral filter array (SFA), whose concept is an extension of the Color Filter Array (CFA) concept [6] with more than three broadband transmissions, and which possibly includes narrowband transmissions. The filter array is installed on top of a single imaging sensor which results in each imaging pixel having its own spectral band and sensitivity curve. The technology used to create the SFA can be interferometric [7], plasmonic [8] or even pigment based [9]. The spectral bandwidth for each band can range between 2-100 nm depending on the technology employed. In contrast to previously described spectral sensors, the spectral sensitivity curve of each spectral band is often not limited to a central wavelength. Most of the aforementioned technologies used to create the SFA generate unwanted sensitivity at multiple wavelengths of light and correlation between their spectral bands by extension.

Color cameras are a small subset of snapshot spectral cameras but also the most commonly found. They employ pigment-based CFAs and are rarely calibrated for quantified spectral measurements. Their spectral bands are usually wide, between 50-100 nm and are strongly correlated to simulate human vision.

The technologies employed in the aforementioned spectral cameras, are diverse and their potential for accurate spectral measurements varies greatly.

Accurately calibrating a spectral measurement device's response is a well-known problem in the art and multiple novel approaches have appeared since the monochromator. Notably [11] is an example of LED-based calibration approach that corrects the central wavelength shifts and the intensity responses of a sensor. While more efficient than a monochromator, the method presented in [11] still employs sequential use of monochromatic light and can only be used to calibrate spectrometers. The discrete nature of the multi-LED light source means that light is not emitted at certain wavelengths, prohibiting its application on fine resolution hyperspectral cameras that are sensitive to those wavelengths. The calibration methods described in [11] is also restricted to spectral measurement devices whose bands are sensitive only to single wavelengths of light, which is not the case for color cameras or interferometric hyperspectral cameras, whose pixels are often sensitive to multiple wavelengths of light across tens or hundreds of nanometers.

In [12], the inventors present a system designed to correct the intensity response of a photosensitive sensor or solar cell under different lighting conditions by using a digitally tunable spectral light source. While not described or covered by the invention, the same technology could be integrated in a method to calibrate spectral measurement devices, gaining speed over a traditional monochromator. However, due to the optical slits and fiber optics employed, the light intensity generated by the device described in [12] cannot be much stronger than a monochromator and presents the same downsides during calibration, such as low signal to noise ratio.

In [13] the inventors describe a device that produces accurate reflectance measurements of a target by using two spectrometers pre-calibrated with a monochromator, one measuring a light source and another measuring the reflected light from the target. High accuracy is achieved by using the emission peaks of the light source to spectrally align the measurements of the two spectrometers before the measured spectra are divided to obtain reflectance. While the method described in [13] relies on a traditional monochromator procedure for spectral response calibration, the real-time correction employed to align the spectral measurements highlights the accuracy limits of a monochromator calibration and the improvement achieved by using measurements to match two spectral devices instead of their pre-calibrated responses.

In order to improve the quality of light sources used for calibrating spectral measurement devices, the inventors of [14] present a design for a digitally tunable spectral light source which makes use of a reference radiometer to calibrate its output. Similarly to the device presented in [12], the device of [14] is based on a monochromator-type system that employs optical slits to reduce light source size before dispersing the light on diffraction gratings, thus severely limiting the output light intensity. While the light source described in [14] could be used for spectral measurement device calibration, the actual method or the potential calibration device are not presented, neither is the benefit with respect to a monochromator.

In [15,16] various tunable light sources are presented that range from tunable lasers to a complex hyperspectral image projection system. These solutions are based on complex and expensive custom optical systems which require extremely precise optical alignment and low tolerance manufacturing. In particular, [16] describes a system that can be used to project hyperspectral images and compare the response of one spectral camera to that of a reference camera, without describing the calibration method specifically. The hyperspectral projection system described employs both spectral and spatial multiplexing, strongly reducing the light intensity, thus requiring the image to be projected into one camera at a time. Such an approach increases the calibration time linearly with the number of sensors added during a calibration session as is inadequate if calibration speed is a priority.

An object of the present invention is to provide a method and a device for fast and accurate calibration of a spectral measurement device, not by measuring its response, but by estimating transfer functions between the measurements that device and those of a reference device.

SUMMARY OF INVENTION

In a first aspect the invention provide a Multichromatic Calibration (MC) method of at least a spectral sensor which is one of a list comprising at least a spectrometer, a multispectral sensor, a hyperspectral sensor, a spectral camera, a color camera. The method comprises
 a. generating a plurality of different multichromatic spectra, wherein
  i. a spectrum from the plurality of different multichromatic spectra contains light intensity measurable by the at least one spectral sensor and by a reference spectral device, and
  ii. a spectrum from the plurality of different multichromatic spectra contains light centered around at least two different wavelengths and is configured to be integrated during an exposure time of a single measurement from any of the at least one spectral sensor or the reference spectral device;
 b. measuring each multichromatic spectrum of the plurality of different multichromatic spectra with the reference spectral device and the at least one spectral sensor; and
 c. from all data of the measured multichromatic spectra, compute a transfer function which relates a response of the at least one spectral sensor to a corresponding response of the reference spectral device, without measuring the spectral response of the at least one spectral sensor.

In a preferred embodiment, the plurality of generated different multichromatic spectra and the corresponding measurements from the reference spectral device are saved, and then loaded and used for multiple calibrations of the at least one spectral sensor to be calibrated.

In a further preferred embodiment, the at least one spectral sensor is a camera for which the multichromatic calibration is performed spatially localized on a sensor surface of the camera thereby enabling to compensate for local camera deviations such as sensor imperfections, sensor manufacturing errors, local sensor spectral sensitivity variations, lens transmission variations, dust in the optical path and lens vignetting, wherein
 d. the sensor surface of the spectral sensor to calibrate is segmented into a plurality of areas; and
 e. a calibration transfer function is estimated for each of the areas of the plurality of areas.

In a further preferred embodiment, measurements of the reference spectral device are transformed by a custom function before being used to compute the transfer function between the measurements of the at least one spectral sensor and measurements the reference device.

In a further preferred embodiment, the transfer function is computed via a linear regression method.

In a further preferred embodiment, the transfer function is computed using a nonlinear machine-learning-oriented method.

In a further preferred embodiment, the transfer function is computed using a nonlinear computational solver-based method.

In a further preferred embodiment, the generating step generates random or pseudo-random multichromatic spectra.

In a further preferred embodiment, the multichromatic spectra generated are piece-wise smooth.

In a further preferred embodiment, the multichromatic spectra generated are weighted by a predefined light source spectrum, as to simulate reflectances of real objects under a given light source.

In a further preferred embodiment, the multichromatic spectra generated are square waves or present randomly distributed square transitions.

In a further preferred embodiment, the generated multichromatic spectra are weighted by a defined or random spectral function.

In a second aspect the invention provides a Multichromatic Calibration Device (MCD) configured to map the response of at least a spectral sensor to calibrate to a response from a reference spectral device, by implementing the method described herein above, and to generate a plurality of multichromatic spectra under control of a computer, whereby the computer is configured for an acquisition of the measurements of the plurality of multichromatic spectra by the reference spectral device and the at least one spectral sensor to be calibrated. The Multichromatic Calibration Device comprises at least following components:

f. a broadband light source emitting spectrally continuous light;
g. an electronically, or digitally, tunable spectral filter enabled to produce and modulate a multichromatic spectrum during at least the exposure time of a single measurement from any of the at least one spectral sensor and the reference spectral device, wherein the digitally tunable spectral filter does not employ optical slits or fiber optics;
h. a diffusive element;
i. a reference spectral device;
j. at least one spectral sensor or device to be calibrated; and
k. a control computer.

In a further preferred embodiment, the broadband light source is a High Intensity Discharge lamp.

In a further preferred embodiment, the broadband light source is a tungsten/halogen lamp.

In a further preferred embodiment, the Digitally Tunable spectral Filter (DTF), enabled to spectrally modulate light, comprises l. a spectral-spatial correlation filter, which isolates specific wavelengths of light at specific spatial locations; and
m. a light intensity filter, which modulates light intensity independently at specific spatial locations.

In a further preferred embodiment, the digitally tunable spectral filter, enabled to spectrally modulate light, comprises a time multiplexed spectrum modulator.

In a further preferred embodiment, for the digitally tunable spectral filter, the spectral-spatial correlation filter comprises a diffraction grating for spectrum production.

In a further preferred embodiment, for the digitally tunable spectral filter, the spectral-spatial correlation filter comprises a linear variable filter for spectrum production.

In a further preferred embodiment, for the digitally tunable spectral filter, the light intensity filter comprises a set of motorized shutters or mirrors for spectral filtering.

In a further preferred embodiment, for the digitally tunable spectral filter, the light intensity filter comprises a Digital Micromirror Device.

In a further preferred embodiment, for the digitally tunable spectral filter, the light intensity filter comprises a Liquid Crystal Display.

In a further preferred embodiment, for the digitally tunable spectral filter, the tunable filter comprises at least one Fabry-Perot cavity with a fast varying output cycle, used as a time multiplexed spectrum modulator.

In a further preferred embodiment, for the digitally tunable spectral filter, the tunable filter comprises an electronically-controlled Lyot filter, used as a time multiplexed spectrum modulator.

In a further preferred embodiment, the digitally tunable spectral filter comprises a Digital Micromirror Device for the light modulation.

In a further preferred embodiment, the diffusive element comprises at least one diffusive element working by reflection.

In a further preferred embodiment, the diffusive element comprises at least one diffusive element working by transmission.

In a further preferred embodiment, the control computer is a computer configured to synchronize actions of the digitally tunable filter, the reference spectral device and the at least one sensor to be calibrated.

In a third aspect the invention provides a use of the multichromatic calibration device of the second aspect, to generate digitally defined custom multichromatic spectra for spectral sensor calibration.

In a fourth aspect the invention provides a use of the multichromatic calibration device of the second aspect, to generate digitally defined custom reflectance spectra as seen under specific lighting conditions such as sunlight, artificial light, custom light sources.

In a fifth aspect, the invention provide an automated self-calibration method which enables mapping of the digital input and the spectral output of the multichromatic calibration device of the second aspect by comparing the digital commands of the digitally tunable spectral filter to the spectral measurement of the reference spectral device, thus estimating automatically and in real-time digital command wavelength and intensity correction functions necessary to generate accurate spectra during the multichromatic calibration of the first aspect, the method comprising the steps of:

n. mapping digital commands to spectral reference device wavelengths by emitting a multichromatic spectrum composed of multiple narrow-band peaks of light and measuring that spectrum with the spectral reference device, then matching emitted and detected peaks to obtain a digital command wavelength correction function;
o. mapping digital commands to spectral reference device intensity measurement by initializing a digital command intensity correction function to have no effect, then iteratively executing the following steps:
  i. (i) generating a desired broadband spectrum with a set of digital commands and the digital command intensity correction function,
  ii. (ii) measuring that spectrum with the spectral reference device,
  iii. (iii) updating the digital command intensity correction function from the deviation between the digital commands and the measured spectrum, and
  iv. (iv) repeating steps i-iii until the digital command intensity correction function does not change.

BRIEF DESCRIPTION OF THE DRAWINGS

The invention will be better understood through the description of example preferred embodiments and in reference to the appended drawings, wherein FIG. 1 contains spectral response curves of various classes of spectral measuring devices, wherein the curves 1001, 1002, 1003 illustrate the transmission in three different regions of the spectrum: red, green and blue respectively, according to prior art.

DETAILED DESCRIPTION OF EXAMPLE PREFERRED EMBODIMENTS

Figure 1:
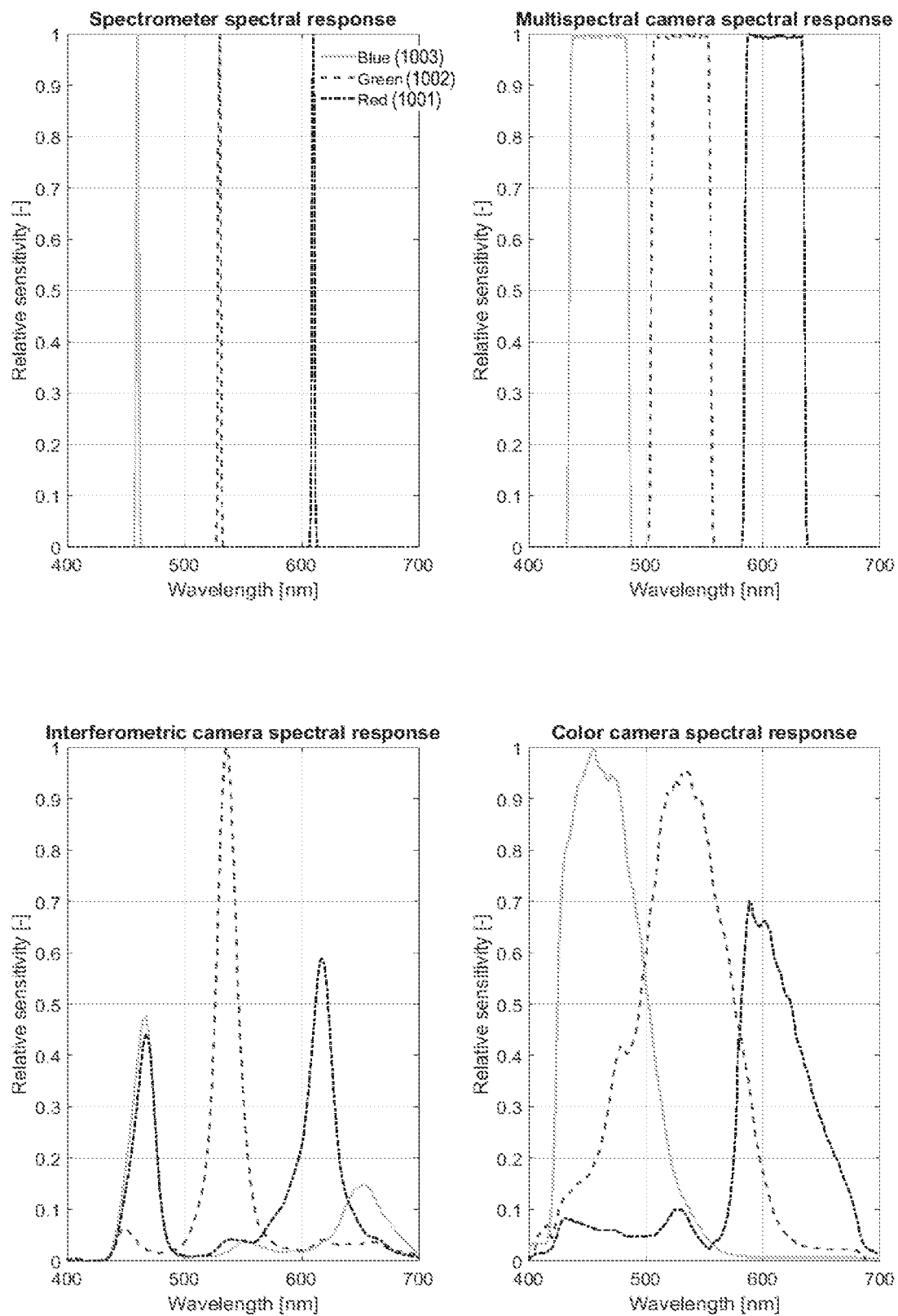

The present invention provides a technique, henceforth called Multichromatic Calibration (MC), developed to perform the spectral calibration of spectral sensing devices such as cameras or spectrometers, henceforth denoted Spectral Device to Calibrate (SDC), with respect to pre-calibrated Spectral Device References (SDRs), by employing digitally tunable spectral light sources. The MC technique is composed of the following steps:
1. Generating a plurality of multichromatic spectra,
2. Measuring the spectra with at least one SDC and an SDR,
3. Estimating a transfer function from each SDC and the SDR measurements that converts the response of the SDCs to that of the SDR.

In contrast to traditional calibration methods that estimate the spectral response of an SDC through measurements of monochromatic scanning, then estimate calibration functions to correct that response for intensity and wavelength errors with respect to a reference, the MC does not measure any response. The MC estimates a mapping or transfer function between the measurements of the SDCs and those of the SDR. Because of the lack of response computation from measurements during MC, the spectra measured by both the SDCs and SDR are not constrained to narrow band monochromatic light and preferably have strong light intensity at multiple wavelengths, greatly increasing the signal measured by both SDCs and SDR. Also because of the lack of response computation and calibration, the MC can calibrate SDCs with complex transmissions such as interferometric or color cameras, whose response cannot be characterized by a central wavelength and bandwidth. The stronger light intensity of multichromatic spectra enables shorter exposure times for the measurements of the spectral devices, reducing the overall time of the calibration. In the case of imaging SDCs, such as spectral cameras, the MC approach can be extended to spatially localized calibration of SDC sensors, thus yielding different transfer functions for different areas of the sensor of the same SDC, calibrating for uniform SDC response as well as globally accurate response with respect to the SDR.

A plurality of multichromatic spectra, as used to estimate transfer functions in the MC, is further defined as a set of spectra having the following properties:

- The wavelength range covered is larger than the sensitivity range of the SDCs which may range from 1 to 12000 nm, preferably from 200 to 1600 nm, most preferred from 400 to 1000 nm and in certain embodiments from 450 to 850 nm.
- Each spectrum of the set of multichromatic spectra has narrow-band light centered around at least two different wavelengths, or broadband light spanning a range of wavelengths wider than 20 nm centered around at least two different wavelengths, or a combination of the two.
- The intensity of each multichromatic spectrum is sufficient such that light centered around at least two different wavelengths is measurable by the SDCs and SDRs, meaning the light measured at those wavelengths overcomes the thermal and readout noise of the SDC and SDR sensors. The preferred light intensity is at least strong enough to be measured by a camera composed of an optical lens of aperture F2.8 and a CMOSIS CMV2000 sensor[17] set at gain 1 dB and an exposure time of 1s.
- Statistical properties of the plurality of multichromatic spectra include a large number of spectra, ranging between 10 and 100000, preferred between 100-500, most preferred between 1000-10000 and preferably high entropy and low overall correlation between the spectra, potentially being randomly or pseudo-randomly generated. The entire plurality of multichromatic spectra may be weighted by an overall spectrum in order to simulate various reflectances as seen under a specific light source.

The digitally controlled generation of light spectra is a concern for numerous applications where specific light spectra are needed. There are several existing ways to address this problematic. It may be done by acting on the primary light sources, through tune and/or composition of LEDs, arc sources (e.g. Xe or Hg), or still more classical incandescent sources. This solution only provides a coarse spectral tunability. The second option works by creating a spectrum from a standard light source and modulating it using special masking technique. Mono- and poly-chromators (see for instance references [2,3] for further reading) are simple and classical examples of devices capable to produce and modulate a spectrum. Both include a light source, an entrance slit, a grating or prism, an optical set capable of projecting the spectrum, and a masking system. such as an optical slit, which allows only a part of the spectrum to exit. The monochromator includes one exit slit which determines the transmission bandwidth of the device. The polychromator has a set of exit slits which allow to select more than one wavelength range. In both cases, the amount of light output is severely reduced by the slits, and the delivered spectrum is either a narrow peak in frequency, or several of them (although larger bands can also be output). More modern methods use the association of a Digital Micromirror Device (DMD) or Liquid Crystal Display (LCD) device in association with Variable Filters, i.e. filters which correlate the spectral transmission with the position on the filter. Such filters modulate in intensity the perceived spectral radiance, as discussed e.g. in reference [1].

In order to perform the MC, a device called Multichromatic Calibration Device (MCD) is required, its elements being further detailed. It first comprises a light source which emits broadband light with a continuous spectrum on the spectral range where the SDCs are sensitive, and it also comprises a digitally tunable spectral filter DTF that filters the broadband light to produce multichromatic spectra. It also includes a control computer which synchronizes all active elements of the MCD to produce and measure a plurality of multichromatic spectra: it acquires data from the SDCs and SDR simultaneously while modulating the multichromatic spectrum output by the DTF such that each multichromatic spectrum is produced and maintained for at least the duration of an exposure of the SDR or the SDCs. The DTF is a key element of the MCD, being the module which produces and modulates spectra from the light source rays, up to a satisfying degree of spectral resolution. The nature of this module may vary in degree of complexity and tunability. The procedure also requires the control computer to contain or generate a library of desired multichromatic spectral patterns to be sent to the MCD in order to produce the plurality of multichromatic spectra used for SDC calibration. A high quality and radiance-calibrated spectrometer may be used as SDR. The spectral range of the SDR and the input light must be broader than that of the SDC. Finally, a diffusive element is needed for the calibration of spectral sensors, in order to homogenize the light that has been spectrally modulated and ensure the SDC and SDR are measuring the same multichromatic spectrum.

Depending on their target application and required spectral accuracy, spectral sensors and cameras may either be sensitive to a narrow wavelength range around each of their band's central wavelength, or they may be sensitive to a large range of wavelengths as shown in FIG. 1, where red (1001), green (1002) and blue (1003) transmission curves are shown for different classes types of spectral cameras, some being more suited for quantified spectral measurements than others; the desired scenario for a spectral sensing device is to have orthogonal, non-correlated, non-overlapping spectral sensitivity curves for each band, in order to reconstruct the measured spectrum of light with high accuracy. In practice, the transmission curves are in general similar to either broadband transmissions of a multispectral sensor, or to the narrow transmissions of a hyperspectral sensor, or still to standard RGB transmissions of commercial cameras. In general, the amount of correlation between the bands can vary greatly from one device to another. This is particularly obvious for the case of the micrometric Fabry-Perot (FP) cavities deposited on the pixels of the sensor. This is illustrated by the curve in FIG. 1 from the interferometric hyperspectral camera, where the transmission 1001 is sensitive to 630 nm (red) but also almost equally to the 460 nm (blue) range of the spectrum. Traditional SDC calibration methods described in [2,3,11,12,13,15,16] do not correct such inter-band correlations, while the MC presently described enables the correction of such effect by estimating an adequate transfer function able to model and correct inter-band dependencies.

Figure 2A:
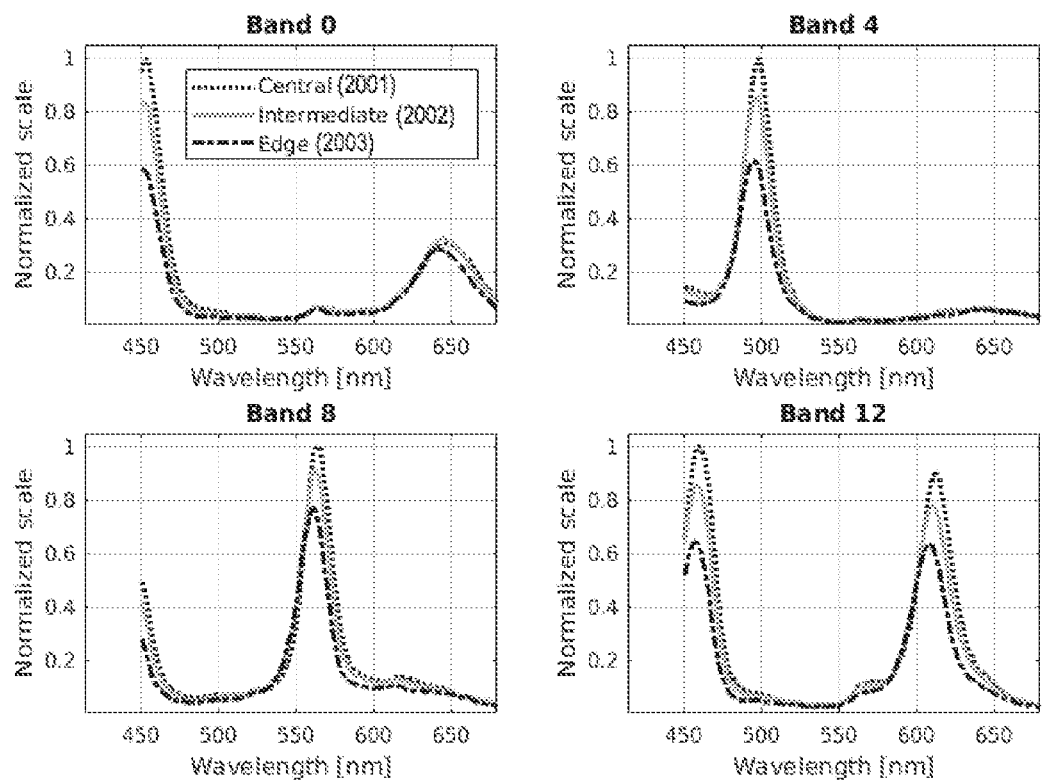
FIG. 2A show the relative transmissions (expressed in terms of camera pixel count per unit of radiance) for different bands in an interferometric hyperspectral camera used as a spectral device to be calibrated, wherein the three curves are measured at different locations on the sensor: central (2001), intermediate (2002), edge (2003)
Figure 2B:
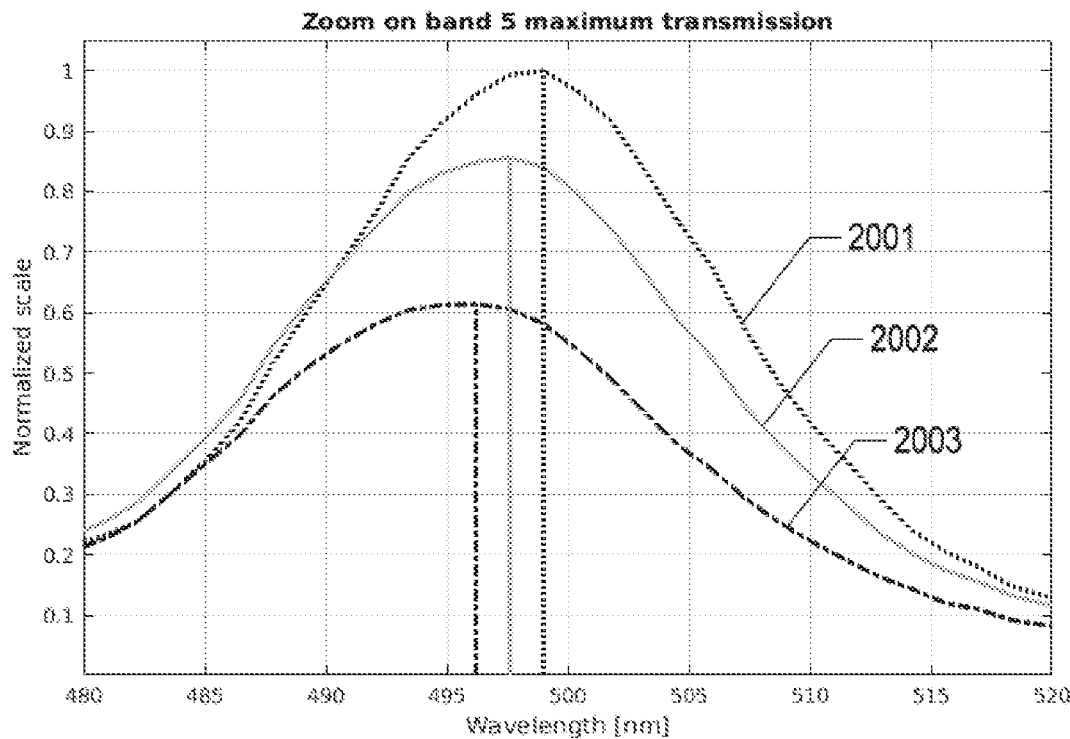
FIG. 2B shows a detailed view of the effects from FIG. 2A, in particular the vertical lines indicate the positions of transmission maxima, and show the shifting effect due to the interaction between the optics and the responses of the Fabry-Perot cavities.

Furthermore, the sensors often have variable quality, from one sensor to another, but also across the surface of each sensor requiring spatially localized calibration that the MC may provide through spatially localized estimation of the SDC-SDR transfer function. The spatial response variability depends to a large extent on the interplay between the focusing optics and the sensor, since the filter's response depends on the collimating optics placed in front of the camera. First order effects are a spectral transmission shift, and a broadening of the spectral transmission function, depending on the light incident angle on the hyperspectral sensor. These effects are illustrated in FIG. 2A, while a detailed view is presented in FIG. 2B. In FIG. 2A, the transmission curves are given for four different bands, between 400 and 700 nm and for three different positions on the sensor: central (2001), intermediate (2002), and edge (2003). In FIG. 2B a zoomed view of the transmission curves for a particular spectral band is obtained by restricting the wavelength range between 480 and 520 nm, in order to enhance the visibility of the transmission shift as a function of the position in the sensor. The vertical lines give the position of the transmissions maximum. The shift between the three curves reaches a strong deviation of 3 to 4 nm and must therefore be corrected during calibration of the spectral sensor. Second, the vicinity of the interferometric filters allows cross-talk between the filters: light hitting one filter with a shallow angle may be redirected to the nearby filter and finally hit the neighboring silicon pixel. An accurate spectral calibration is therefore required to allow the decorrelation of the hyperspectral data measured by the interferometric camera onto a cube of data where each layer corresponds to a well-defined transmission which is ideal, or desired, (non-correlated and non-overlapping with all other transmissions, for instance), thus generating a radiance cube. The MCD is particularly adapted to calibrate for these complex defects, and in general for the calibration of any sensor which is used for the measurement of spectral radiance or reflectance.

A main goal of the MC is to deduce a transfer function (F) to convert the original data cube as measured by the SDC ($S_{raw}$), where physical transmission bands may overlap, to a data cube where transmission bands are desired ($S_{desired}$), for instance ideal and decorrelated transmission responses. Multiple approaches be used to define and estimate the transfer function, based either on simple linear regression or machine-learning oriented techniques, but in all cases, the goal is to find the transfer function F which fits Equation 1.

$$S_{desired} = F(S_{raw}) \qquad \text{(eq. 1)}$$

For the sake of simplicity and without loss of generality, in what follows we consider the case of sufficiently simple SDC calibration to be treated as a linear problem, to be solved by linear regression. The description can be easily extended to nonlinear contexts, and solved by more complex solving approach, e.g., machine-learning oriented.

The simplest definition of the transfer function F is a B×B calibration matrix. It links the B components of the vector $S_{desired}$ (e.g., measured radiance values) and the B components of the vector $S_{raw}$ (e.g., sensor digital counts). The core of the MC method discussed in this document is composed of two steps leading to the estimation of the transfer function, specifically a calibration matrix.

The first step is the sequential generation and measurement of a large (N) number of multichromatic spectra, simultaneously with the SDR and the SDC. The N acquisitions of the vector $S_{desired}$ (SDR) and $S_{raw}$ (SDC) form two N×B matrices: $M_{desired}$ and $M_{raw}$, respectively. The B-th column of $M_{raw}$ contains the measurements corresponding to the B-th filter in the SDC. The B-th column of $M_{desired}$ contains to the product of the radiance measured by the SDR and a function (typically gaussian) representing the desired B-th transmission.

The M matrices are linked through the relation described in Equation 2.

$$M_{desired} = M_{raw} T \qquad \text{(eq. 2)}$$

The second step of the MC consists of the estimation of T, the B×B matrix defined in Equation 2. The estimation can be achieved by solving the linear system described by the above matrix equation.

Defining the calibration, or transfer function, F may be extended to other nonlinear models. For instance, F may be a neural-network, with B input neurons and B output neurons, as well as hidden layers with variable number of neurons, whose relations are defined from the training phase, i.e. using the N spectra produced by the MCD, measured by the SDR and SDC. The output number of neurons is also not constrained by the input number of neurons. In some cases, a transfer function outputting more, or fewer, bands than received in input can be defined, either by machine learning algorithms, or by computational solvers as used in compressive sensing. Such a transfer function may be computed by mapping $S_{raw}$ to a $S_{desired}$ which is derived from the SDR measurements such that the number of bands in $S_{desired}$ is different than the number of bands in $S_{raw}$ a trivial derivation if the SDR has more bands than the SDCs.

The multichromatic calibration can also be optimized by saving the N spectra measured by the SDR, as well as the N configurations necessary to regenerate the corresponding spectra. Upon SDC calibration, the saved SDR spectra can be loaded to estimate F, while the saved configurations are used to regenerated the same N spectra. This allows the MC to be executed faster, without the need for SDR and SDC synchronous data acquisition, particularly if the SDR requires higher exposure times than the SDCs.

The Multichromatic Calibration Device

Figure 3:
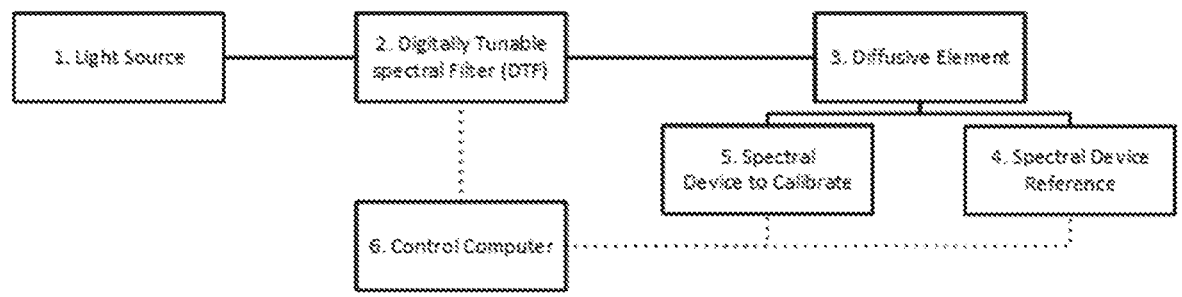
FIG. 3 shows a Multichromatic Calibration Device (MCD) overview of components and their connections, wherein solid lines show physical connections, while dotted lines show the links between the devices and the controlling computers.

Various technological choices can drive the design of the MCD, in particular to allow a computer-based on-demand, i.e., dynamic, masking/modulation of spectral radiance. A general description and components of the MCD are summarized in FIG. 3. In the preferred embodiment of the MCD, a light source (1) is present, whose light flux enters the digitally-tunable spectral filter (2, DTF), where the spectrum production, or modulation, is performed. In the preferred embodiment of the MCD, the modulated spectrum enters in a diffusive element (3) that homogenizes the modulated spectrum across various locations. In the preferred embodiment, the MCD also comprises a spectral reference device such an accurate spectrometer, (4, SDR) which measures the diffused light from (3), acting as a reference for any (self-)calibration. The preferred embodiment also comprises one or more spectral sensor(s) to calibrate (5, SDC). In one embodiment of the MCD, the SDR acquires data simultaneously with the SDC. In another embodiment of the MCD, the SDR may acquire data independently of the SDC, the MCD reproducing the same spectra and using the same reference SDR data for multiple SDC calibrations.

Light Source Embodiment

Figure 4:
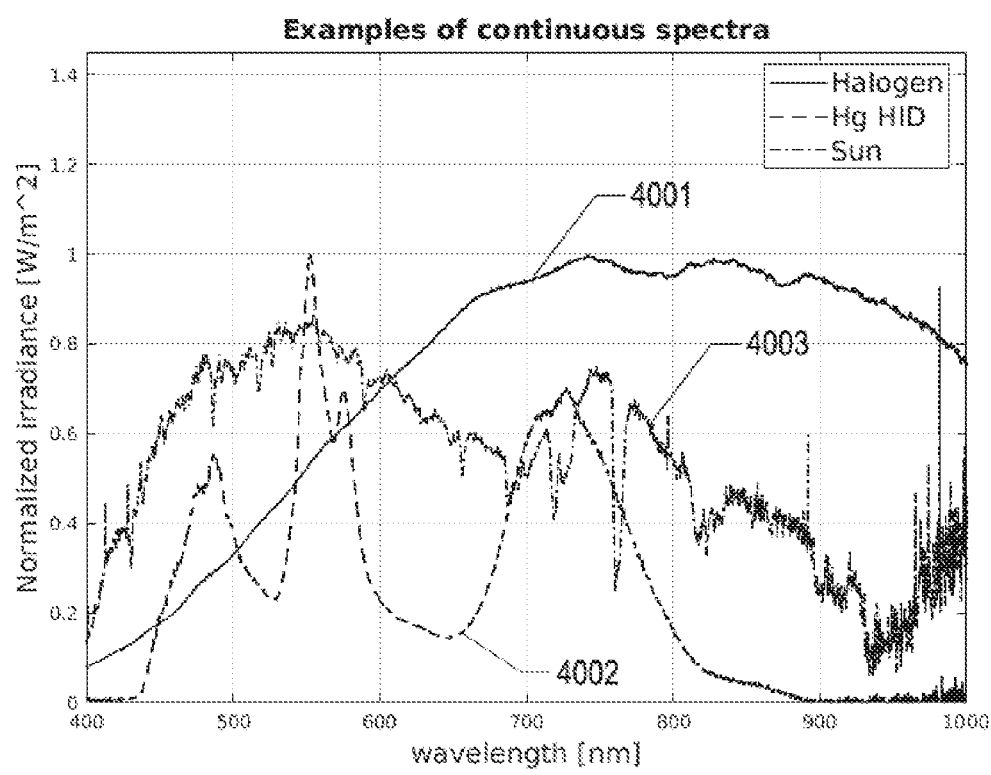
FIG. 4 shows the (continuous) spectra of a halogen (4001), a Mercury high intensity discharge lamps (4002), as well as that of the Sun (4003), according to prior art.

The light source (1) embodiment comprises different possibilities but is represented in all cases by a broadband continuous light source emitting light across a spectral range larger than the sensitivity range of the SDCs. It may be a high power (100-300 W, typically) halogen or high-intensity-discharge (HID) lamp. Halogen lamps show spectral output close to that of a 3600 Kelvin blackbody radiation. Their spectrum is smooth but may lack power in the 400 nm range. In addition, a filament size generally increases with the power, which may create issues if focusing their light in a small volume is critical. Metal halide HID lamps have a more uniform distribution of spectral power but show strong emission peaks. HID lamps are the standard light source of modern high-power projectors. The volume of the light emission region can be very small, which eases the focusing, for instance through an elliptic or parabolic reflector. Examples of continuous spectra in the visible and infrared ranges are shown in FIG. 4. The spectrum of a typical halogen lamp (4001), a high voltage discharge lamp using mercury (4002), and the sun spectrum (4003) are given.

The Digitally Tunable Spectral Filter (DTF) Embodiment

The multichromatic spectrum production, or modulation, is achieved by a digitally tunable filter that covers a spectral range equal or larger than the sensitivity range of the SDCs and can be defined as a combination of techniques belonging to two mutually exclusive classes:

The space-dependent spectrum generation is defined by a full correlation between space and light frequency, hence the spectrum modulation depends directly on spatial masking (mechanical or not).

The time-dependent spectrum generator is defined by the complementary group to the space-dependent spectrum generation. Interconnections between these two groups are possible.

Figure 5A:
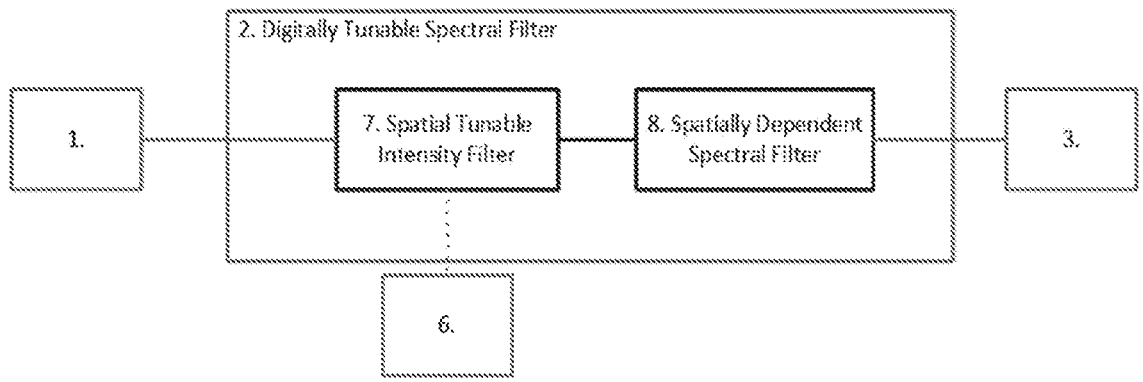
FIG. 5A shows an example of digitally tunable spectral filter embodiment where a digitally controlled spatial tunable filter first filters white light, then projects it onto a spatially dependent spectral filter, thus generating a custom spectrum.
Figure 5B:
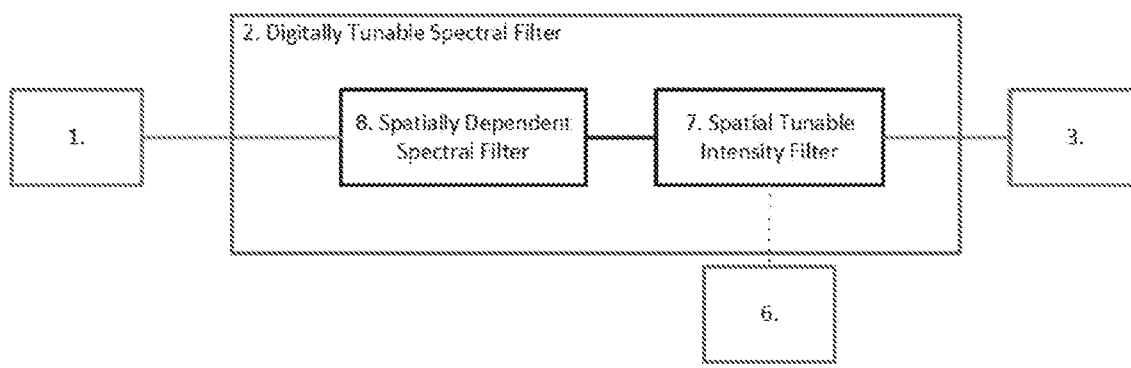
FIG. 5B shows an example of digitally tunable spectral filter embodiment where white light is first decomposed spectrally by a spatially dependent spectral filter, then a digitally controlled spatial tunable filter filters the intensity of the decomposed light at various locations, thus generating a custom spectrum.
Figure 5C:
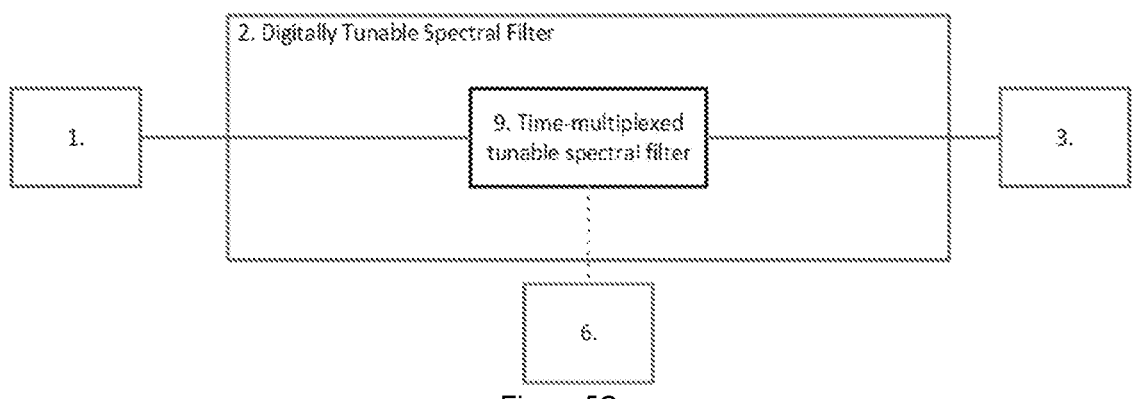
FIG. 5C shows an example of digitally tunable spectral filter embodiment where a fastvarying tunable spectral filter may be used to quickly change configuration and generate a custom spectrum, as integrated during a given amount of time, typically corresponding to the integration time of the sensors used in the calibration procedure.

The most general description of the digitally-tunable spectral filter is illustrated in FIGS. 5A, 5B and 5C through three examples of internal arrangement. The first example (5A) is a spatial tunable intensity filter (7) which receives collimated light from (1), and transmits a collimated light flux where the light intensity depends on the spatial coordinates to the spatially-dependent spectral filter (8). This light flux is in turn converted to a modulated spectrum by filtering through a spectral filter where dependency between space coordinate and output light wavelength exists. A second example (5B) is a spatially-dependent spectral filter (8) which receives a collimated light flux, converts it to a spatially dispersed spectrum which is projected on a spatial tunable intensity filter (7) which in turn modulates the light intensity as a function of location, modulating by extension the spectral intensity of a wavelength. The third and last example (5C) is a time-dependent spectral filter (9) which receives light from the light source and applies rapid filtering on different central wavelengths, acting as a time multiplexed spectrum modulator during a single exposure time of the SDCs and SDR.

DTF Embodiment 1: Arrangement (8)-(7)

The simplest representative embodiment of a DTF is a computer controlled mono- or polychromator. In this embodiment, (8) is a diffraction grating, and (7) is a set of shutters aligned with the wavelengths of interest.

Figure 6:
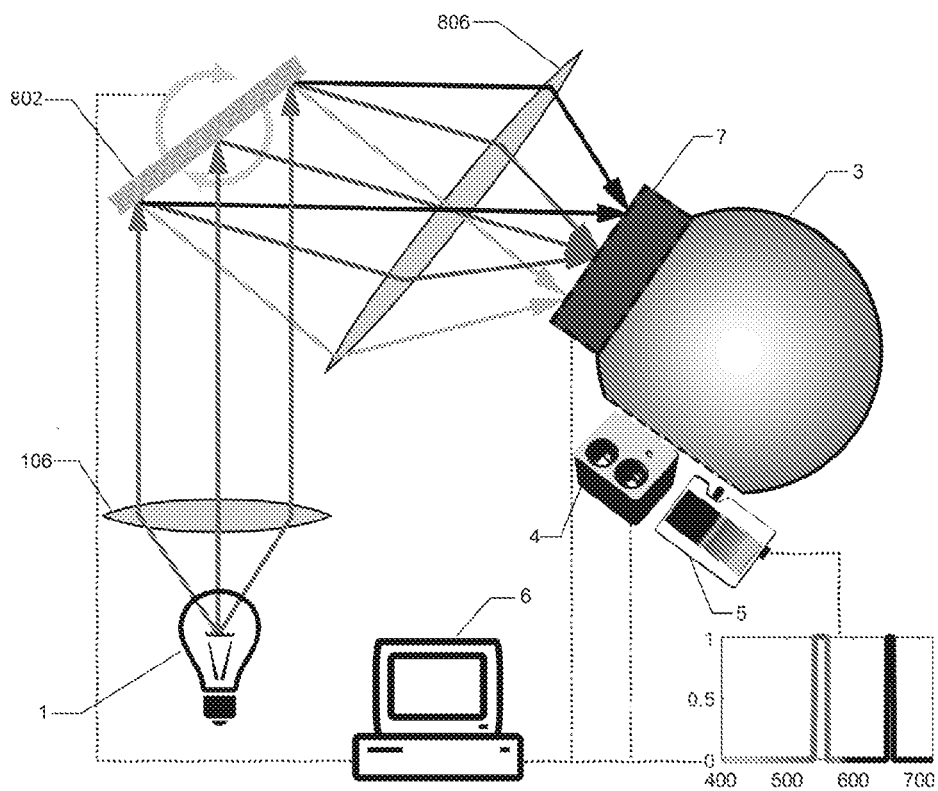
FIG. 6 contains a schematic of MCD implementation with digitally tunable spectral filter based on diffraction grating and mechanical shutters.
Figure 7:
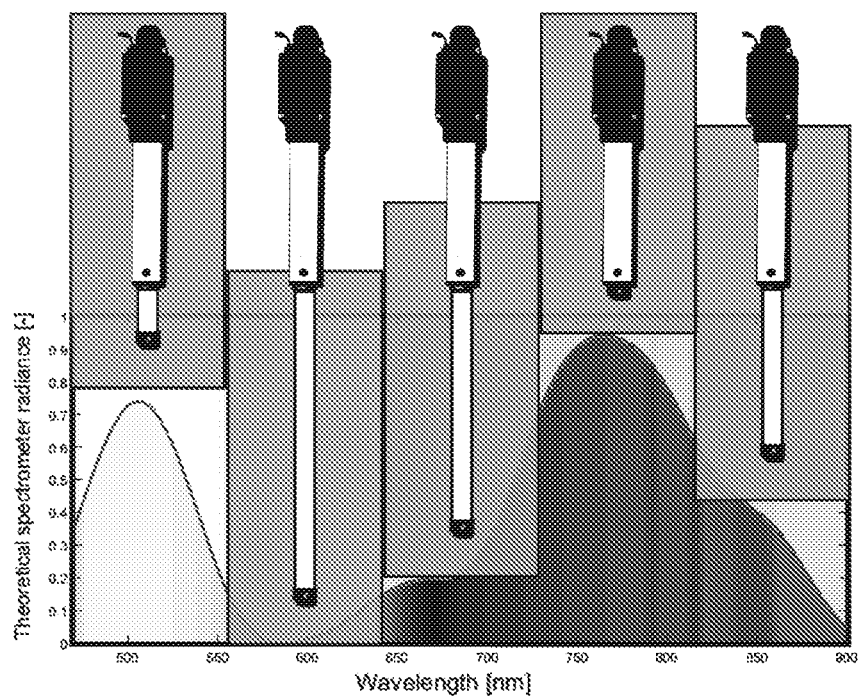
FIG. 7 contains a diagram showing how mechanical shutter positions influence the spectrum measured by the Spectral Device Reference (SDR) at the exit of the diffusion chamber.

As illustrated in FIG. 6, the embodiment comprises a collimating module (106), a diffraction module (802) which must have the freedom to rotate and whose orientation is controlled electronically by a control computer (6). It also comprises a second collimating module (806), a set of shutters (7) which are controlled by servo motors (servo motors not illustrated in FIG. 6), themselves controlled by the control computer (6). The way the shutters (7) modulate the spectrum is illustrated in FIG. 7: each shutter is attached to a servo motor, and the spectrum is projected on the set of shutters. The position of each shutter therefore determines the amount of light transmitted in the wavelength range covered by the projection of the spectrum on the shutter width. This process modulates the light amplitude as a function of the wavelength (illustrated by the smooth curve on the figure).

The grating rotation capability adds an additional degree of freedom to define where the shutter edges are positioned with respect to the spectrum projection. As such, assuming that N shutters can be 'up' or 'down', that they do not overlap, that the minimal rotation of the grating angle is A, and that the projection of one shutter on the frequency space is P, this gives N*P/A possible spectra. If the mechanical shutters may be not only set in extremal but also in any intermediate M positions, a much larger number (N*M*P/A) of spectral radiances can be obtained, in principle limited only by the resolution of the motors and/or the related controlling electronics. As such, the described embodiment of the MCD may already be used to produce a considerable number of different spectra.

DTF Embodiment 2: Arrangement (7)-(8)

Figure 8:
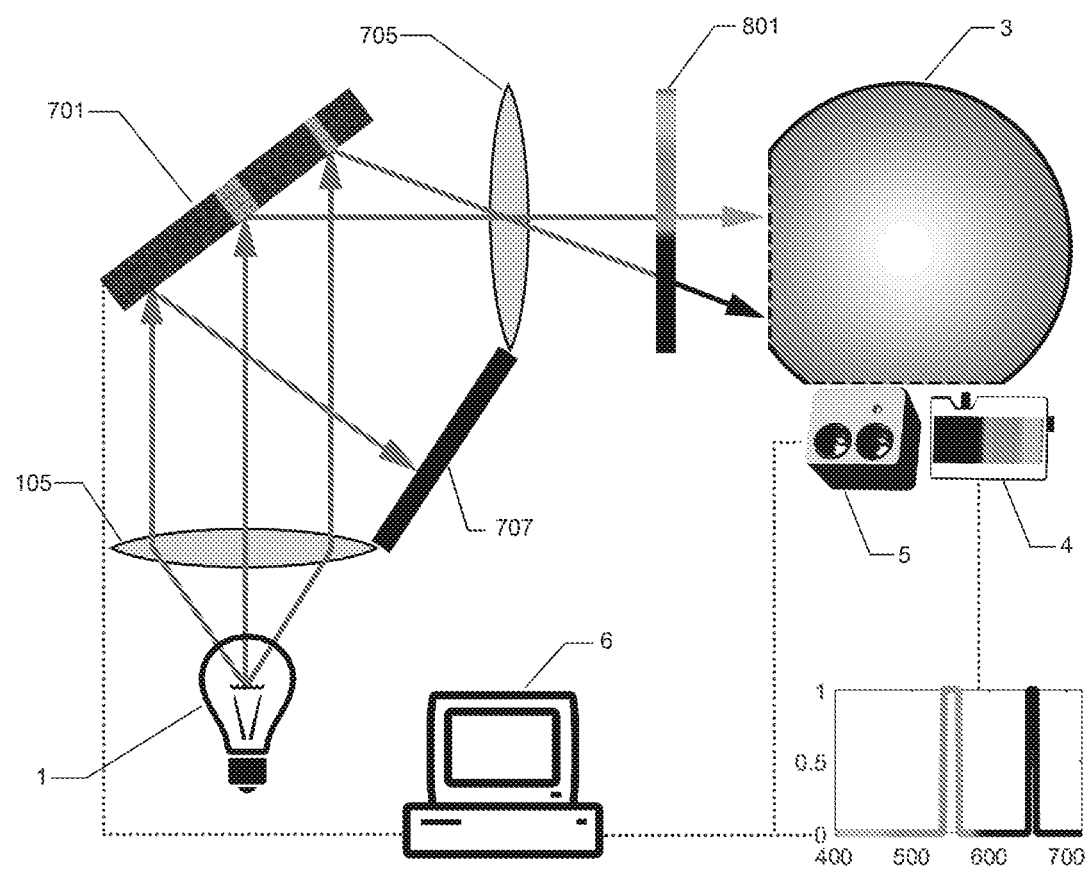
FIG. 8 contains a schematic of MCD implementation with digitally tunable spectral filter based on diffraction grating and mechanical shutters.

In this case, the main elements are shown in FIG. 8, and use similar principles as in described in [1] for the spectrum production and modulation. The DTF embodiment 2 comprises a module (105) which renders the light input from (1) uniform, a Digital Micromirror Device (DMD, 701) which receives the light and, by acting on the millions of micromirrors present, projects on-demand dark and light zones, exactly like in a video projector. It also includes a set of lenses (705) able to project the image of the DMD onto a possibly small surface, typically close to that of the linear variable filter (LVF, 801), and a black light sink (707) where the unwanted light is projected and absorbed. The presence of the linear variable filter is also comprised in the DTF embodiment 2. The LVF receives the light projected by the lenses and couples the spectral frequency and spatial locations of projected light through the use of a interferential filter whose thickness varies linearly with along one axis.

The advantages of this configuration over the monochromator are considerable as explained in following points:

The spectral resolution depends only on the DMD spatial resolution and on the LVF resolution. As of time of writing, commercialized LVF do offer typical spectral resolution around 1-2% of their central wavelengths and commercialized DMD have a spatial resolution (inverse of the number of independent columns of mirrors) better than one per mil. This means that, as of time of writing, the reproduction of spectra could be performed with a spectral resolution slightly higher than that of the LVF.

The device can be built in a relatively small volume, which ensures portability.

The device is extremely flexible in terms of light source choice. Even sources exhibiting peaks (typical of discharge lamps) can be used thanks to the spectral radiance equalization obtained by a self-calibration procedure further described.

For the same source, the amount of light reaching the sensors is significantly higher than in the case of a monochromator or polychromator, since the integrality of the light (potentially hundreds of Watts) can be transmitted to the LVF.

The O(50 µs) integration time of the DMD's mirror modulation DMD is roughly a thousand times shorter than that the human eye or a video camera, enabling extremely fast generation and acquisition of a large number of spectra.

There are no mechanical moving parts involved, which implies good reproducibility of the generated spectra.

The current DTF embodiment also includes the case where an LCD screen is used in association with an LVF, the LCD working as a transmission filter. The essential advantage of the LCD over the DMD is that it can be positioned very close to the LVF, reducing misalignment issues, and device volume. The main current drawback is the bad opacity of LCD in the infrared range, which currently limits its use up to ~700 nm with standard polarizers used in LCD technology.

DTF Embodiment 3: Alternative (9)

The DTF embodiment 3 comprises the possibility to apply spectral modulation thanks to a time-multiplexed device, such as the one described in [4]. Practical examples are based on e.g. electronically/digitally tunable Fabry-Perot cavities or Lyot filters. The time evolution of the DTF state spans over a given range of wavelengths within a period of time shorter than the acquisition time of the SDC and SDR. The variation of speed at which the cavity evolves is a simple means to weight the importance of each wavelength over the time. Assuming that the state of the DTF evolves cyclically and that the integration time of a sensor is sufficiently larger than the evolution period of the DTF, the perception of the spectrum by that SDC/SDR is directly related to the product of the light source radiance and the DTF transmission weighted by the time spent at each wavelength. If the DTF evolution speed cannot be modulated, this part of the modulation can be handled by the state evolution of a DMD/LCD coupled with the DTF.

In case the DTF is made from a Fabry-Perot cavity, the output naturally delivers a series of transmission peaks (which are inherent to the light wave undulatory behavior and therefore the result of cyclic constructive and destructive interferences), a second filter with broader transmission, possibly another Fabry-Perot cavity with different physical characteristics, could be required to filter out all but one harmonics of the first Fabry-Perot cavity. The synchronicity between the two cavities would ensure that only one transmission peak remains, at any step in the cyclic scan of the wavelength range.

The Diffusive Element Embodiment

The diffusive element (3) embodiment homogenizes the spectrum measured by the SDR and SDCs and comprises the possibility of a diffusive volume working by reflection. The simplest example is the integration volume, i.e. a shallow (often spherical) volume which spatially mixes the incoming light, thanks to the Lambertian properties of its inner surface, and lets the homogenized light exit through holes in its surface. Another embodiment includes the possibility of diffusive element working by transmission. The crucial point, independently of the choice of diffusive element (reflection or transmission), is to have an identical spectral radiance exiting the diffusive elements, independently of the location of light measurements. This ensures first that any correlation between space and spectral radiance vanishes, and second, that all spectral measurement devices installed on the diffusive element may measure the same output spectrum.

In one embodiment, the diffusive element is a white sphere, and a converging lens system (302) installed at the entrance of the diffusive sphere ensures that light rays with different wavelengths are equally projected on the same spot in the sphere.

The SDR Embodiment

The SDR (4) embodiment comprises all cases of spectral light measurement devices which are properly pre-calibrated to produce a desired response, most preferred a radiance measurement. This includes spectrometers, but also hyperspectral or multispectral sensors, or still color cameras.

The SDC Embodiment

The SDC (5) embodiment comprises any spectral measurement device to be calibrated. This includes spectrometers, color cameras and multispectral or hyperspectral imaging sensors. Examples of spectral filtering techniques employed in the SDCs are be pigment based, interferential, diffractive or plasmonic. The calibration of the SDC as generated by the MDC is the same to be used on data acquisition. It includes several effects ranging from the interaction between the optics and the sensor to the optical configuration of the SDC during the calibration. Indeed, the transfer function between the SDC and SDR is affected by effects such as of vignetting, irregular spatial or spectral transmittance, tilt between the sensor(s) and the optics, all of which are addressed by the MC calibration with the MCD.

The Control Computer Embodiment

Finally, the present embodiment of the MCD includes a control computer (6) which synchronizes the multichromatic spectrum modulation, the SDR acquisition (4) and SDC acquisition (5) such that the same multichromatic spectrum is output by the DTF during at least an SDC or SDR exposure, and measured by all spectral measurement devices simultaneously. The control computer can either be a standalone computer containing drivers for control of the SDR, SDC and DTF, or it can be a low-level embedded computer built at a hardware level to control the aforementioned MCD components.

In one embodiment, the control computer contains predetermined spectra that are acquired by an SDR and saves the SDR output to be used with multiple SDC calibrations, avoiding the need for simultaneous SDC and SDR spectral acquisition. In the context where the MCD is built to high mechanical accuracy, and spectra generation is repeatable, the approach of saving the SDR data can speed-up calibration of SDCs.

Implementation of a Multichromatic Calibration with a MCD

MCD Initialization

Before starting the calibration procedure, the adequate positioning of the different elements composing the MCD is required. This includes the optical alignment of the light source, DTF, and the placement of the SDR and SDCs on the diffusive volume. Each device should face an equally illuminated region of the diffusive device. In the case of the integration sphere, a simple approach is to have 90 degrees between the entrance hole and the SDR and SDCs, and 90 degrees between the SDR and SDCs. The limit on the number of SDCs that can be accurately calibrated is a case-by-case problem. It corresponds to the limit above which the presence of the SDC influences in a significant way the homogeneity of light diffusion in the sphere. This may induce a bias between SDR and SDC measurements, and therefore a bias in the SDC calibration, which should be avoided. The next step is the self-calibration procedure.

Self-Calibration Procedure

The MCD requires no accurate spectral of mechanical calibration, as the accuracy of the SDC's calibration is mainly dictated by that of the SDR and not the MCD itself. The MCD only needs to produce a large number of multichromatic spectra of sufficient entropy, or diversity, to accurately estimate the calibration transfer function that converts the SDC output to that of the SDR.

Figure 9:
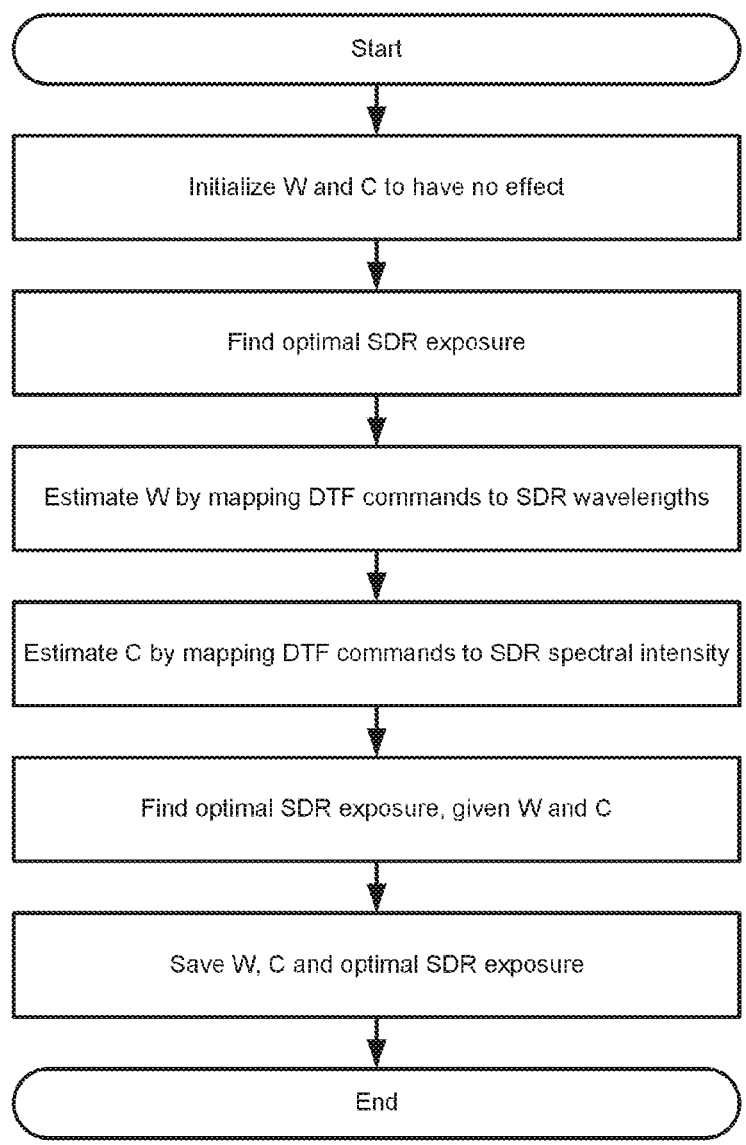
FIG. 9 contains a flowchart describing the essential steps of the MCD self-calibration.

However, an automated self-calibration procedure executed on the control computer (6) is still beneficial to ensure the MCD functions in optimal conditions and the spectra produced suffer no bias that would impact the SDC's calibration. The MCD self-calibration procedure estimates a DTF command wavelength correction function W, a DTF command intensity correction function C and an SDR optimal exposure as described in the flowchart of FIG. 9, the procedure comprising the following steps:

1. initializing W and C such that they have no effect on DTF commands,
2. finding optimal SDR exposure,
3. mapping DTF commands to SDR spectral wavelengths by estimating a function W,
4. mapping DTF commands to light intensity as measured by the SDR and constraining the maximal DTF transmission to alter the broadband spectral profile of the light source (1) by estimating a function C, 5. finding optimal SDR exposure for W and C corrected maximal DTF transmission
6. saving W, C and optimal SDR exposure for use of correcting DTF commands during MC.

W may be a linear function such as a linear regression, or a non-linear function such as a piece-wise polynomial. C may be an additive or multiplicative correction, or a combination of the two.

Finding the optimal SDR exposure is required to ensure that spectrum output from DTF is accurately measured by the SDR in its entirety and achieved through the following steps:

1. configure DTF for maximal transmission on all bands given W and C,
2. set SDR exposure to maximum value,
3. acquire an SDR spectral measurement,
4. if the SDR measurement contains saturated values, reduce SDR exposure and repeat from step 2; otherwise set the current SDR exposure as the optimal SDR exposure.

Figure 10:
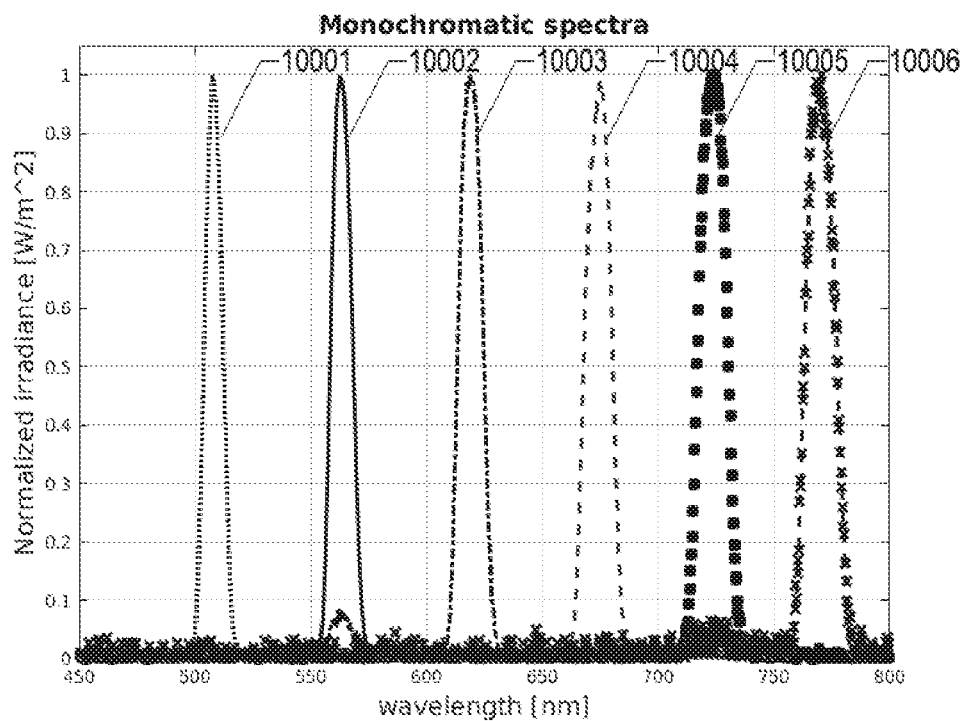
FIG. 10 shows an example of monochromatic spectra obtained by activating six Digital Micromirror Device (DMD) columns groups corresponding to equally spaced wavelengths; each line (10001, 10002, 10003, 10004, 10005, 10006) corresponds to a different group.

Mapping DTF commands to SDR spectral wavelengths is required to ensure that the digital multichromatic spectra library is produced by the DTF at correct spectral wavelengths and comprised the following steps:

1. configure DTF to produce a single multichromatic spectrum of narrowband light intensity centered around at least two wavelengths of light as shown in FIG. 10, where each peak corresponds to curves 10001 through 10006,
2. acquire an SDR spectral measurement of the spectrum produced in step 1,
3. detect wavelengths of spectral peaks from the SDR measurement of step 2,
4. estimate a function W between the narrowband wavelengths activated on the DTF in step 1. and the wavelengths of peaks detected from the SDR measurement in step 3, the estimation using the spectral order of the narrowband wavelengths activated and the peaks detected to match correspondences.

Figure 11:
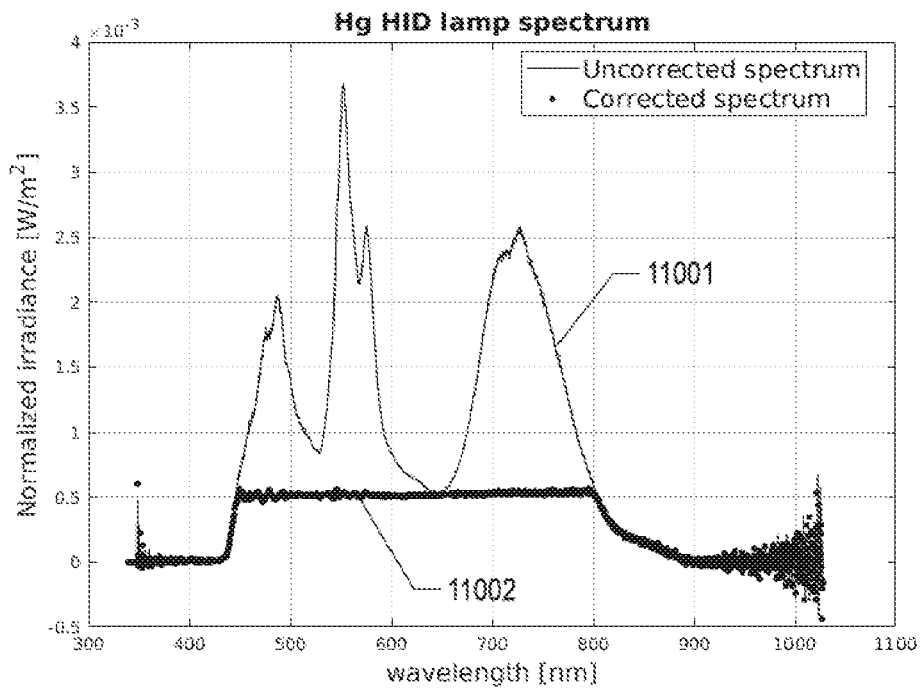
FIG. 11 contains an MCD output spectrum when a Mercury high intensity discharge lamp is used as light source, before (11001) and after (11002) spectral radiance equalization, whereby this demonstrates the spectral flattening capabilities of the self-calibration.

Mapping DTF commands to desired light intensity as measured by the SDR is required to ensure that the digital multichromatic spectra library is produced by the DTF without bias from the MCD light source. The intensity mapping is an iterative procedure that sets a desired DTF maximal transmission baseline broadband spectrum, that is preferably flat as illustrated in FIG. 11 where the original light source HID spectrum (11001) is shown together with the flattened one (11002). The desired DTF maximal transmission may also be non-flat, encompassing baseline broadband spectra that simulate various light sources such as sunlight, fluorescent, incandescent, etc. The intensity mapping procedure is comprised the following steps:

1. configure DTF to produce a desired baseline broadband spectrum given C and W,
2. acquire an SDR spectral measurement of spectrum produced in step 1,
3. estimate a DTF configuration intensity correction C from the ratio or difference between the DTF configuration of step 1. and the SDR measurement of step 2, and
4. repeat from step 2. until C converges from one iteration of steps 2 and 3 to the next iteration, meaning changes to C between iterations are negligible.

SDC Calibration

Once self-calibrated, the MCD may be used for spectral device calibration following a loopbased workflow that is implemented on the control computer (6), the calibration workflow executing the following sequence of steps:

1. load or generate a plurality of N digital multichromatic spectra that may be random or pseudo-random
2. for each digital multichromatic spectrum
   a. configure DTF to produce and modulate the same multichromatic spectrum, given W, and C obtained during the self-calibration procedure,
   b. acquire the produced multichromatic spectrum with the SDR and with SDC(s), and
   c. save the SDR and SDC raw measurement data.

The data acquisition may be achieved simultaneously using multi-threading on the control computer. Once the calibration data is acquired from all spectral devices, the calibration function for the given SDR-SDC pairs is estimated from the data.

Figure 12:
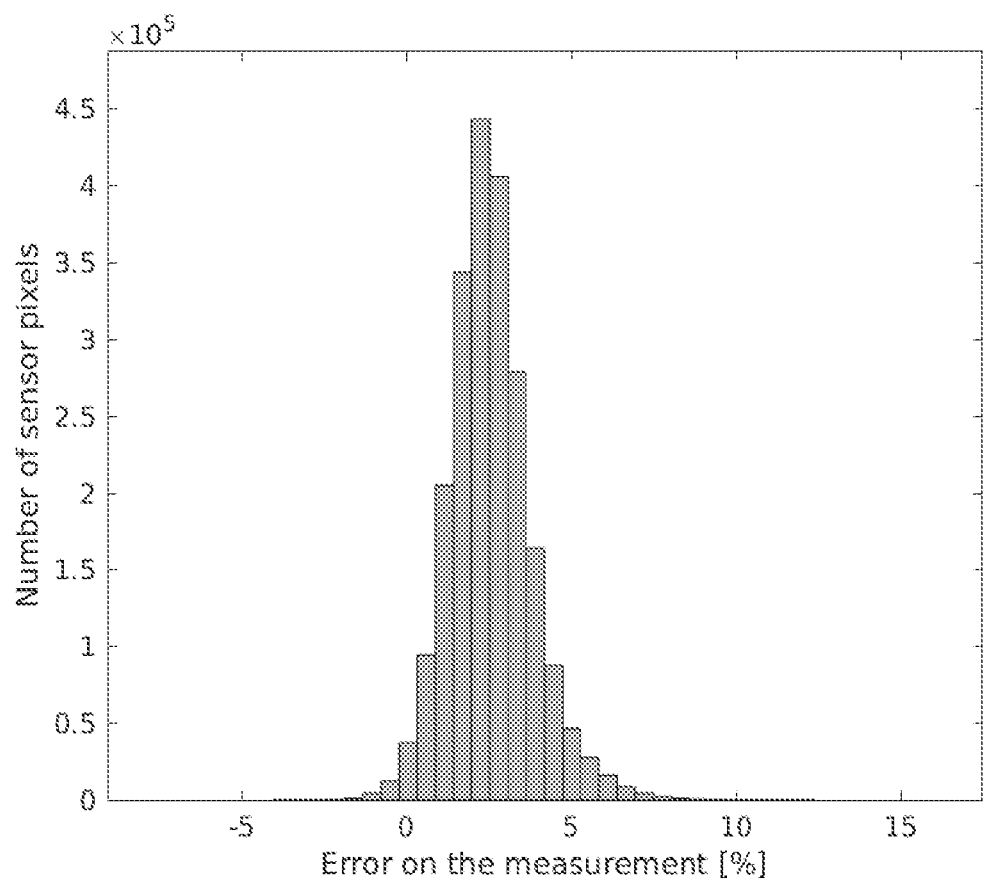
FIG. 12 shows the error histogram calculated after multichromatic calibration of an interferometric hyperspectral camera, wherein the uncertainty on the measurement is expressed in percent.

The transfer function F, aimed at performing the SDC calibration, is deduced from the N acquisitions of the SDR and SDC. If the SDC is a camera and the calibration is based on one central region of the SDC sensor, with a filter response characterized by a given correlation between the region position on the sensor and the optics, the application of this calibration to regions where this correlation is different may result in biases in the radiance. In the case of interferometric hyperspectral camera SDCs, the largest sources of bias are the vignetting and wavelength shift due to light rays incidence. In this context, the effect on filter transmission of these two sources is visible in FIGS. 2A and 2B, where the filters transmissions of different bands from an interferometric hyperspectral camera are shown. For four sample bands, three curves are shown, each curve related to a different location on the sensor. The vignetting effect is visible by the lowering of the curve amplitude, while the impact of the interplay between the optics and filter response is mostly visible as a shift towards smaller wavelength. To cope with the dependency between the calibration and position on the sensor, the transfer function estimation must be performed independently on different zones on the sensor. The efficiency of the transfer function F estimation, based on a simple linear regression method, is demonstrated in FIG. 12. In this example, the sensor is divided in more than fifteen thousand regions, each used to provide a different transfer function. The histogram in FIG. 12 quantifies the relative uncertainty on the radiance computation for one band from a hyperspectral camera calibrated with the MC and the MCD. This closure test of radiance calibration is done using a small series of pseudo-random projected spectra, each containing sharp variations of spectral radiance. This test demonstrates that the MCD and related calibration techniques deliver desired radiance responses that can be computed with a precision better than two or three percent in average, on the entire surface of the spectral sensor. If spatially localized calibration of the sensor surface is ignored, and a unique, central and small region of the sensor is used for global calibration, errors larger than fifty percent are common at the edges of the sensor. This means that the vignetting effect, and all residual effects from the combination of sensor and optics are efficiently corrected when applying the MC locally. This method therefore allows to produce multiband radiance maps with a precision typically below five percent. Various types of measurements can be based on this approach, including precise estimation of target reflectances as soon as a reference radiance, radiance or reflectance is known.

Light-Source Dependent MCD Calibration

The self-calibration procedure of the MCD can be used to eliminate biases from generated spectra, but it can also introduce them. A specific use-case for introducing calibration biases is to optimize calibration quality of spectral devices for use under specific light sources. If the SDC will be used mostly under direct sunlight, the self-calibration procedure can used to generate a sunlight spectral curve, instead of a spectrally flat white light. The multichromatic spectra used for calibration can thus be representative of naturally occurring radiance spectra under daylight conditions. The resulting calibration will perform worse under artificial lighting conditions, but it will also improve calibration accuracy for the specific use-case of daylight spectral measurements.

The possibility of simulating light-sources is also important since it allows to perform minimal closure tests of SDC calibration quality by following the steps described below.

1. A set of multichromatic spectra of interest is projected via the DTF, close to the type of spectra to be surveyed by the SDC. An acquisition from the SDCs and SDR is operated for each projection.
2. The images of the SDC are converted to two-dimensional radiance measurements, obtained from the calibration of the SDC raw data with the transfer function F derived from the calibration. A cube with B spectral radiance spectral layers is obtained.
3. The radiance value for each layer is compared with the radiance estimated from the product of the measurement from the SDR and the corresponding ideal gaussian transmission.
4. Using a reasonably large set of spectra, an estimate of the systematic uncertainties on the SDC measurement can be derived. This test does not provide an absolute nor conservative estimate of the systematic uncertainties, but rather serves as a test of necessary condition to show that the hyperspectral sensor MC strategy works. In particular
   a. Biases in the hyperspectral sensor measurements may be present but not seen in this closure test because of the MCD use for both the calibration and the closure-test.
   b. The field of view of the SDR and SDC in the MCD are very homogenous, i.e. almost flat-field, independently of the wavelength, which may not be the case in images taken in e.g. industrial context. The spectral layers homogeneity influences in particular the importance of cross-talk between adjacent filters/pixels in the context of sensors equipped with SFA, therefore the calibration of the SDC correspond to an idealized situation in terms of image contrast and patterns.

Figure 13A:
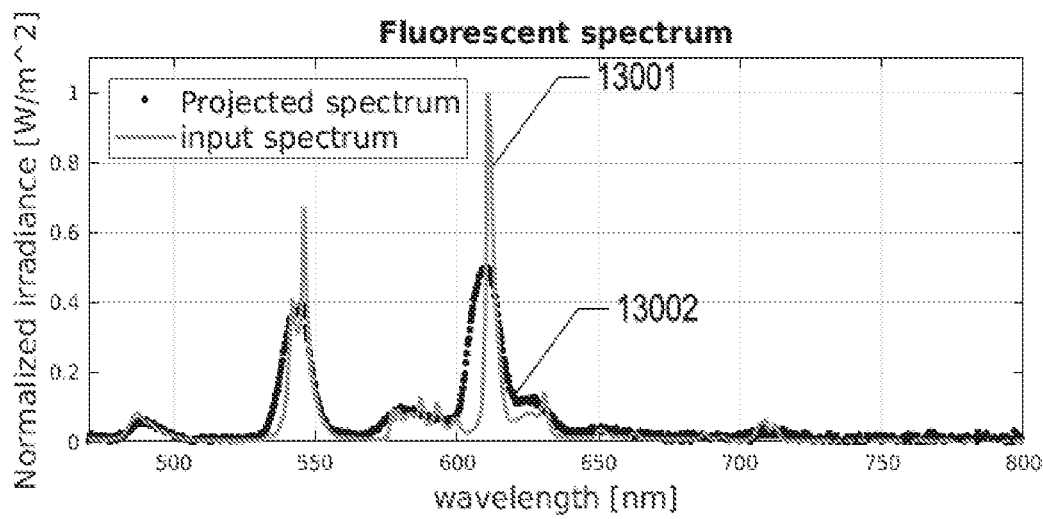
FIG. 13A illustrates the simulation of a fluorescent spectrum via the MCD, wherein curve 13001 indicates the digital spectrum that is meant to be reproduced by the MCD, and curve 13002 indicates the spectrum measures at the output of the MCD.
Figure 13B:
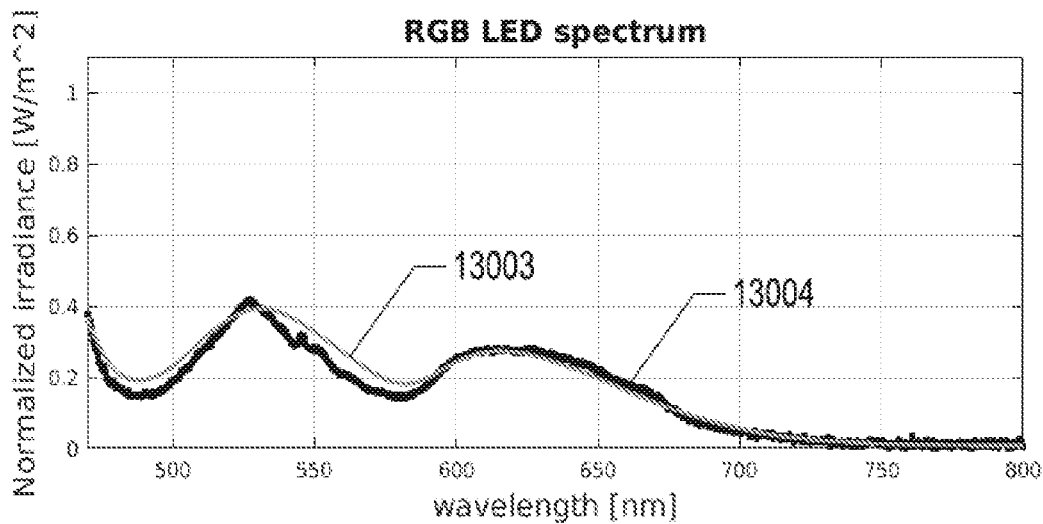
FIG. 13B illustrates the simulation of a red-green-blue LED spectrum via the MCD, wherein curve 13003 indicates the digital spectrum that is meant to be reproduced by the MCD, and curve 13004 indicates the spectrum measures at the output of the MCD.
Figure 13C:
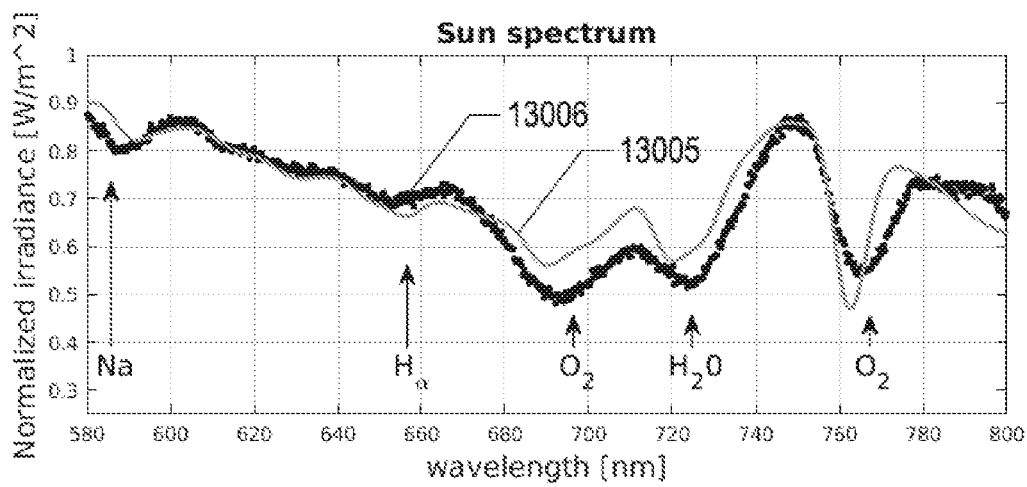
FIG. 13C illustrates the simulation of a solar spectrum via the MCD, wherein curve 13005 indicates the digital spectrum that is meant to be reproduced by the MCD, and curve 13006 indicates the spectrum measures at the output of the MCD.
Figure 14:
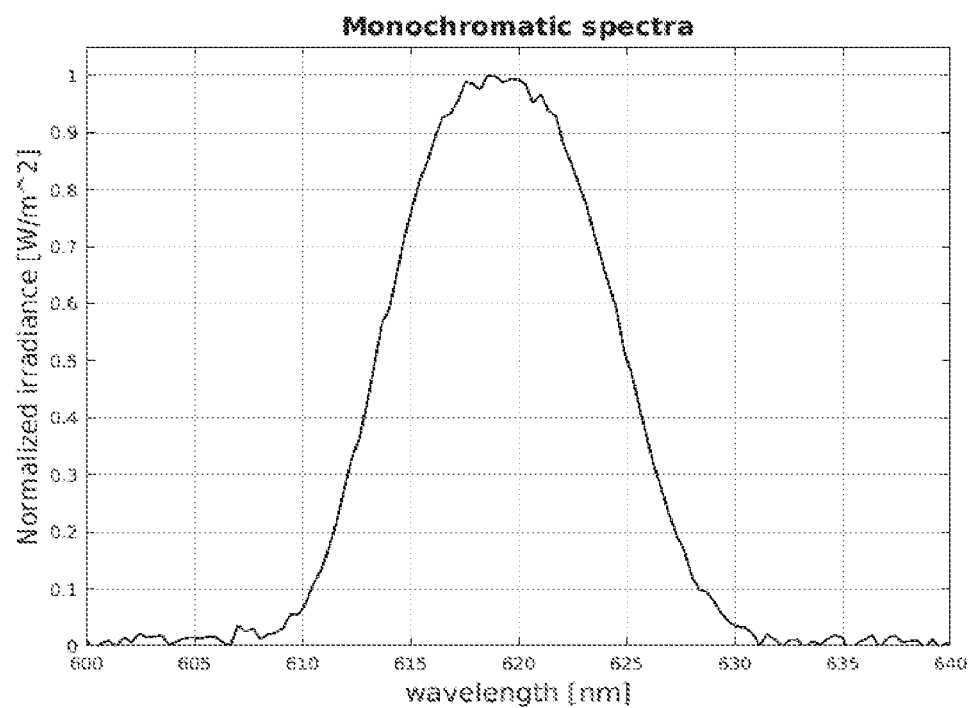
FIG. 14 shows a typical spectrum recorded if a thin vertical pattern is sent in the MCD, wherein the full-width-half-maximum is close to 12 nm, i.e., 2% of the central wavelength, which is perfectly inline with the specifications of the Linearly Variable Filter (LVF) and shows that the use of the DMD does not degrade the optimal spectral resolution.

The ability of the MCD to produce different types of spectra is demonstrated in FIG. 13A (fluorescent light source, representative of discrete emissions), 13B (standard color LED screen), 13C (the sun spectrum, focused on a particular region of the visible spectrum in which characteristic atmospheric absorption bands are present). The comparison is made between the pattern injected in the MCD, i.e. to be simulated (13001, 13003, 13005), and the spectra measured (13002, 13004, 13006) at the exit of the MCD integration sphere. These comparisons show that the important features are well reproduced in all cases. The main limitation, at the time of writing this text, is the LVF spectral resolution: the full-width-at-half-maximum (FWHM) of the transmission of the considered LVF is close to 2% of the wavelength, i.e. close to 10 nm at 500 nm and above 15 nm in the SWIR range. The FIG. 14 shows a typical narrowband transmission close to 620 nm, with the FWHM of 12 nm. An improvement of spectral resolution at the level of the LVF would immediately enhance the perception of finer features.

Figure 15:
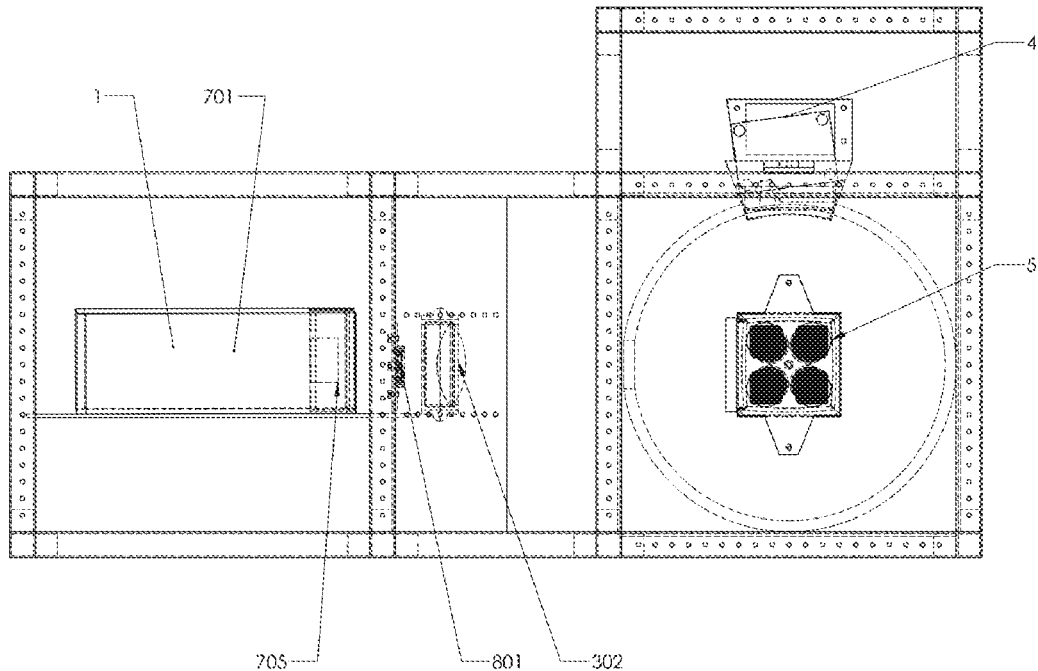
FIG. 15 is a section view of a MCD prototype based on the DMD-LVF alternative, wherein from left to right: the box apparatus containing the light source, DMD and collimating optics, the LVF and an achromatic doublet which focuses the outcoming diverging light beam onto a point on the furthest point of the integration sphere, and wherein the SDCs, for instance hyperspectral cameras, are visible in the integration sphere, and on the upper side of the integration sphere, a SDR such as a spectrometer is also visible, this prototype having been used to produce several results discussed in this document (FIG. 2A, 2B, 4, 10-14).

The technical drawing of a MCD prototype, used to support the discussion held in this document, is shown in FIG. 15. The FIG. 15 contains, from left to right: a device which includes the light source (1), the DMD (701), an optical apparatus whose role is to focus the image of the DMD on the LVF (801). A second optical setup (302) is present to focus the transmitted light on the opposite side of an integration volume (here, a sphere), to which a set of SDC (5) and a spectrometer (4) are attached.

REFERENCES CITED

[1] U.S. Pat. No. 6,657,758
[2] U.S. Pat. No. 5,192,981
[3] William G. Fastie, "A Small Plane Grating Monochromator," J. Opt. Soc. Am. 42, 641-647
[4] Heikki Saari et al., "Compact Infrared Hyperspectral Imagers Based on Piezo-Actuated Fabry-Perot Interferometers", VTT Microelectronic Systems, Espoo, Finland.
[6] U.S. Pat. No. 3,971,065 A
[7] WO 2013064510 A1
[8] http://pubs.acs.orgiauthor/Yokogawa %2C+Sozo et al., "Plasmonic Color Filters for CMOS Image Sensor Applications", Nano Lett., 2012, 12 (8), pp 4349-4354
[9] Hiroshi Taguchi et al., "Technology of color filter materials for image sensor"
[10] Wendlandt, Wesley William, and Harry G. Hecht. Reflectance spectroscopy. New York: Interscience, 1966.
[11] US 2009051910A1
[12] US 2011084717A1
[13] US 2003011767A1
[14] US 2013003064A1
[15] Joseph P. Rice et al. "DMD diffraction measurements to support design of projectors for test and evaluation of multispectral and hyperspectral imaging sensors"
[16] John T. Woodward et al. "Hyperspectral imager characterization and calibration"
[17] CMV2000 Datasheet-v3.2, CMOSIS image sensors, 2012 CMOSIS NV, https://forums.xilinx.com/xlnx/attachments/xlnx/XLNXBRD/8298/1/datasheet_CMV2000%20 v3%202.pdf

The invention claimed is:

1. A Multichromatic Calibration (MC) method of at least a spectral sensor which is at least one from a list comprising a spectrometer, a multispectral sensor, a hyperspectral sensor, a spectral camera, a color camera, the method comprising the steps of:
   a. generating a plurality of different multichromatic spectra, wherein
      i. a spectrum from the plurality of different multichromatic spectra includes light intensity measurable by the at least one spectral sensor and by a reference spectral device, and
      ii. a spectrum from the plurality of different multichromatic spectra includes light centered around at least two different wavelengths and is configured to be integrated during an exposure time of a single measurement from any of the at least one spectral sensor or the reference spectral device;
   b. measuring each multichromatic spectrum of the plurality of different multichromatic spectra with the reference spectral device and the at least one spectral sensor; and c. from all data of the measured multichromatic spectra, compute a transfer function which relates a response of the at least one spectral sensor to a corresponding response of the reference spectral device, without measuring the spectral response of the at least one spectral sensor.

2. The method of claim 1, wherein the plurality of generated different multichromatic spectra and the corresponding measurements from the reference spectral device are saved, and then loaded and used for multiple calibrations of the at least one spectral sensor to be calibrated.

3. The method of claim 1, wherein the at least one spectral sensor is a camera for which the multichromatic calibration is performed spatially localized on a sensor surface of the camera thereby enabling to compensate for local camera deviations such as sensor imperfections, sensor manufacturing errors, local sensor spectral sensitivity variations, lens transmission variations, dust in the optical path and lens vignetting, wherein
 a. the sensor surface of the spectral sensor to calibrate is segmented into a plurality of areas; and
 b. a calibration transfer function is estimated for each of the areas of the plurality of areas.

4. The method of claim 1 wherein measurements of the reference spectral device are transformed by a custom function before being used to compute the transfer function between the measurements of the at least one spectral sensor and measurements the reference device.

5. The method of claim 1 wherein the transfer function is computed via a linear regression method.

6. The method of claim 1 wherein the transfer function is computed using a nonlinear machine-learning-oriented method.

7. The method of claim 1 wherein the transfer function is computed using a nonlinear computational solver-based method.

8. The method of claim 1, wherein the generating step generates random or pseudo-random multichromatic spectra.

9. The method of claim 8, wherein the multichromatic spectra generated are piecewise smooth.

10. The method of claim 1, wherein the multichromatic spectra generated are weighted by a predefined light source spectrum, as to simulate reflectances of real objects under a given light source.

11. The method of claim 1, wherein the multichromatic spectra generated are square waves or present randomly distributed square transitions.

12. The method of claim 1, wherein the generated multichromatic spectra are weighted by a defined or random spectral function.

13. An automated self-calibration method which enables mapping of a digital input and the spectral output of a multichromatic calibration device by comparing the digital commands of a digitally tunable spectral filter to the spectral measurement of the reference spectral device, thus estimating automatically and in real-time digital command wavelength and intensity correction functions necessary to generate accurate spectra during the multichromatic calibration of claim 1, the method comprising the steps of:
 a. mapping digital commands to spectral reference device wavelengths by emitting a multichromatic spectrum composed of multiple narrow-band peaks of light and measuring that spectrum with the spectral reference device, then matching emitted and detected peaks to obtain a digital command wavelength correction function;
 b. mapping digital commands to spectral reference device intensity measurement by initializing a digital command intensity correction function to have no effect, then iteratively executing the following steps:
  i. (i) generating a desired broadband spectrum with a set of digital commands and the digital command intensity correction function,
  ii. (ii) measuring that spectrum with the spectral reference device,
  iii. (iii) updating the digital command intensity correction function from the deviation between the digital commands and the measured spectrum, and
  iv. (iv) repeating steps i-iii until the digital command intensity correction function does not change.

* * * * *